Nov. 26, 1929.　　C. T. FLEMING　　1,737,305
FISHING TOOL ATTACHMENT
Filed May 11, 1927
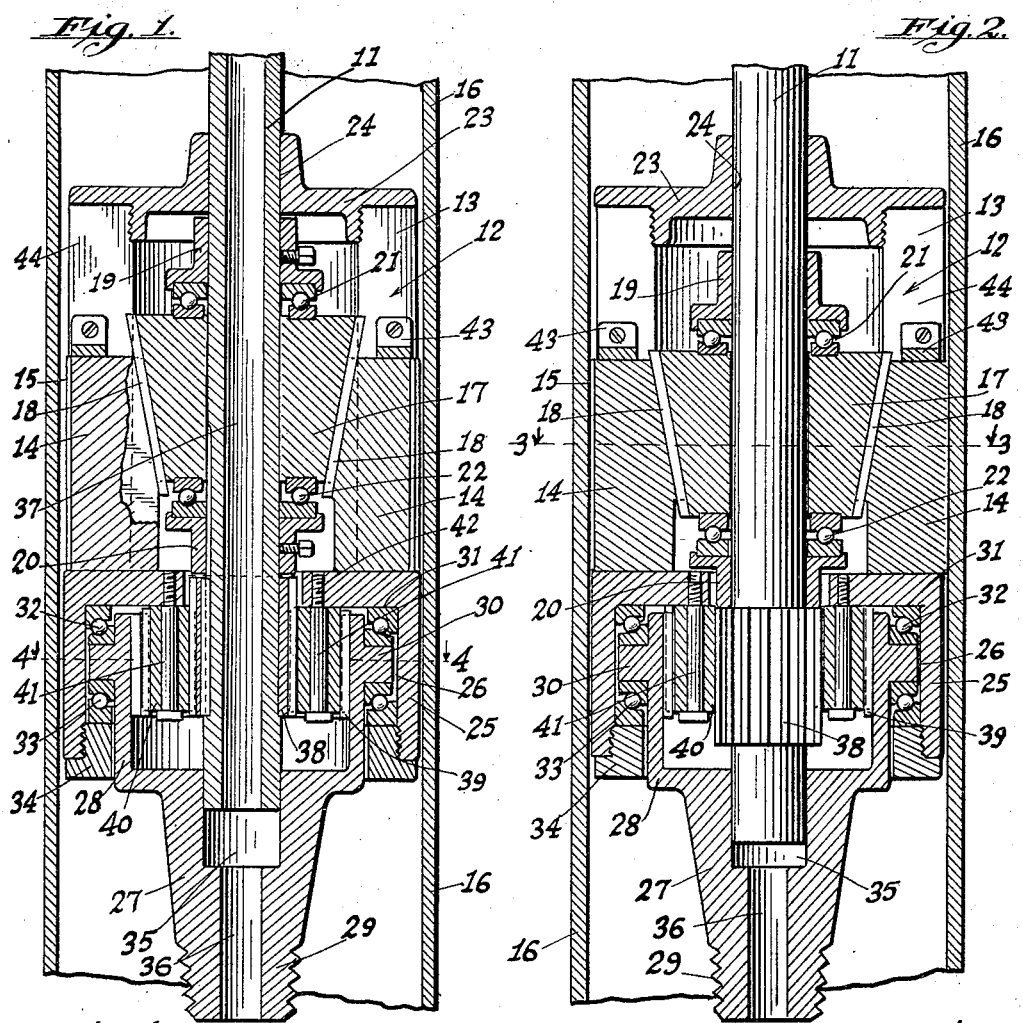
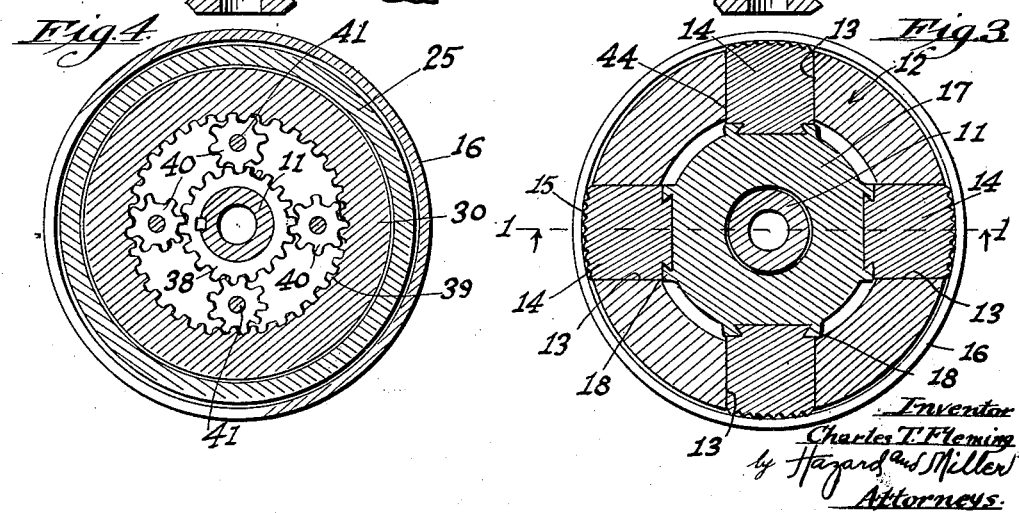
Inventor
Charles T. Fleming
by Hazard and Miller
Attorneys.

Patented Nov. 26, 1929

1,737,305

UNITED STATES PATENT OFFICE

CHARLES T. FLEMING, OF SANTA FE SPRINGS, CALIFORNIA

FISHING-TOOL ATTACHMENT

Application filed May 11, 1927. Serial No. 190,635.

My invention comprises a fishing tool attachment and is to allow unscrewing of tools or pipes or other well equipment which it is desired to remove from the well.

An object of my invention is the construction of a part of a fishing tool or a device which may be used with fishing tools to transform a rotation in one direction to a rotation in another direction, for instance, so that if the drill tools, well pipe, or other structures to be removed in the well have right hand threads, to unscrew these by a left hand rotation, the tool or implement itself being given a right hand rotation from the top of the well. The usual practice is to introduce fishing equipment or the like which has left hand threads and to grip the article to be fished in a suitable manner and to unscrew parts of the article at the joints by rotating to the left.

With my equipment connected to a suitable fishing tool for gripping the fish, a drill stem or the like having right hand threads may have my fishing tool attachment connected thereto and by rotating the drill stem in a right hand direction, which will prevent unscrewing of the joints of the drill stem, the lower part of the attachment is given a left hand rotation and hence the fishing tool holding the article to be fished is given a left hand rotation and unscrews the fish at the joints. It may remove one stand of pipe or the like at a time or a number of stands, depending on the joint which unscrews most readily.

My fishing tool attachment comprises a stem or the like which may be attached to a drill stem or other connection leading to the top of the well and such connection having couplings which may have, for instance, right hand threads. A casting or the like is secured to the stem and has a plurality of slips, which may be forced outwardly by a wedge block, in order to hold the casting or body of the attachment stationary. The stem is rotatable relatively to the wedge block and slips, rotating inside of the body structure of the attachment, and has a gear directly connected thereto at the lower end. A hub structure has an internal gear and between the inner gear or pinion, secured to the drill stem and the internal gear on the hub, there are a plurality of planetary gears secured on fixed journals to the body of the attachment. Thus the hub is given a reverse direction of rotation to that of the drill stem. The hub is provided with means for securing a fishing tool or the like. Such tool may be of any suitable character to engage and hold the article to be fished. On account of the reverse direction of the rotation, drill rods, pipes, or other equipment having a thread opposite to that of the drill stem may be unscrewed at the couplings.

My invention will be more readily understood from the following description and drawings, in which:

Figure 1 is a vertical section of my invention taken on the line 1—1 of Fig. 3 in the direction of the arrows.

Figure 2 is a view similar to Fig. 1 showing the slips expanded and the wedge block in its lower position.

Figure 3 is a horizontal section on the line 3—3 of Fig. 2 in the direction of the arrows.

Figure 4 is a horizontal section on the line 4—4 of Fig. 1 in the direction of the arrows.

A central stem 11, illustrated as tubular, is designed to be connected to a drill stem or the like by suitable couplings so that the fishing tool attachment may be lowered into the well to the desired depth and, if desired, in connection with the drill stem or above my attachment there will be a jar to give an upward action. A substantial body structure 12, preferably being a casting, has a plurality of radial slots or slideways 13 with vertical walls in which are mounted slips 14, these slips having teeth 15 to engage a well casing 16. The slips are attached to a wedge block 17 by a dovetailed connection 18. This wedge block is connected to the stem 11 by means of an upper collar 19 and a lower collar 20 rigidly clamped to the drill stem by set screws or the like and by the use of antifriction upper and lower bearings 21 and 22. These bearings and the collars are so constructed that the wedge block 17 is held on the stem but allows relative rotation of the wedge block and the stem. A cap 23 is secured to the upper end of the body structure 12 and allows a sliding fit of the stem at the opening 24.

The lower part of the body structure has an annular flange 25 forming an enlarged recess 26 and in this recess is mounted a hub 27 having an upper wall 28, there being a threaded pin 29 on the lower end of the hub. A collar 30 is formed on the wall 28. Between the collar and the base 31 of the main portion of the body structure is an upper anti-friction bearing 32. A lower antifriction bearing 33 below the collar is held in place by an annular nut 34 threaded on the lower part of the flange 25. By this means the hub is suspended from the body structure to allow rotational movement. The hub is provided with a recess 35 and with a lower bore 36, this being in alignment with the bore 37 of the stem 11.

A power transmission comprises an inner gear or pinion 38 which is mounted directly on the drill stem and secured thereto, and an outer annular internal gear 39 which is secured to the upper part 28 of the hub 27. A series of planetary gears 40 are mounted on vertical shafts 41 which are secured into the base of the main body structure, as indicated at 42. Insertable bars 43 secured to the side walls 44 of the slots or slideways 13 retain the slips in position.

The attachment is assembled by inserting the stem with the wedge block attached downwardly into the body structure 11, the cap 23 being removed, and the wedge block passing downwardly engaging the slips 14 in the slideways with the dovetailed connection being assembled as the wedge block descends. The insertable bars 43 are then placed over the top of the slips and the cap 23 is secured in position, being rigidly connected to the body structure. The planetary gears 40 are connected to their vertical shafts 41. The hub 27 is then inserted and secured in place by the ring nut 34. When the attachment is lowered into a well casing the collar 19, being fixedly secured to the stem 11, carries the weight of the structure transmitted through the cap 23 and in this free lowering the wedge block 17 is drawn upwardly and thence the slips 14 are drawn inwardly out of contact with the well casing.

Before lowering the attachment into the well, a suitable fishing tool is secured to the pin end 29 of the hub 27, this being a type of fishing tool suitable to grasp and retain the particular article to be fished. It is also desirable on the drill stems or the like, which are connected to the stem 11, to have a jar to give an upward jarring action.

When the fishing tool attached to the pin 29 comes in contact with the article to be fished, the downward movement of the hub and the main body structure 12 is prevented. Therefore the drill stem 11 with the wedge block 17 is relatively lowered from the position of Fig. 1 to that of Fig. 2, thus forcing the slips 14 outwardly into engagement with the well casing and preventing relative movement of the fishing tool attachment and the well casing.

Presuming it is desired to remove a string of drill rods, pipe, or other well equipment which has right hand threads at the couplings, the couplings for the different lengths of drill stems connected to the stem 11 would also have right hand threads and after the fish has been gripped, the drill stem will be given what is termed a right hand rotation, this rotating the pinion 38 which is directly connected at the lower end of the stem. As the planetary gears 40 are held stationary in the body structure which is clamped to the well casing, these transmit a motion to the hub and rotate the hub 27 through the medium of the gear 39 in what is termed a left hand direction. The hub then transmits this motion through the fishing tool connected to the pin 29 and unscrews the article being fished at a joint. It may happen that if there is a considerable length of equipment to be fished that one stand of this length may be removed at an operation or a considerable number of stands, depending on the joint which is easiest to unscrew.

After the fish is unscrewed the drill stem connected to the stem 11 is drawn upwardly and this pulls the wedge block 17 up, which latter draws the slips 14 inwardly due to the dovetailed connection 18. Should there be considerable resistance to the inward pull of the slips and the upward pull of the wedge block, the jar may be operated. The collar 19 then engages the cap 23 and the weight of the article fished is supported on the stem 11 through the medium of the body structure, the lower antifriction bearing 33, the nut ring 34 and the hub 27, the fishing attachment and the article fished being thus lifted to the top of the well.

Various changes may be made in the principles of my invention without departing from the spirit thereof, as set forth in the description, drawings and claims.

I claim:

1. A fishing tool attachment comprising in combination a body structure having radial slots forming slideways, a cap secured to the top of the body structure, a hub rotatably mounted on the lower end of the body structure, a stem slidably mounted through the cap and through said body structure, upper and lower collars secured to the stem, a wedge block surrounding the stem, thrust bearings between the said collars and the wedge block, slips mounted in the slideways engaging the said wedge block, and a system of gearing between the stem and the hub to rotate the hub in an opposite direction to that of the stem.

2. A fishing tool attachment, as claimed in claim 1, the lower end of the body structure having a depending flange forming an enlarged recess, and the said hub being mounted in said recess and supported on anti-friction bearings therein.

3. A fishing tool attachment comprising in combination a body structure, radially acting slips mounted therein, a stem slidably and rotatably mounted in the said body, a wedge block engaging the slips, means holding the block against displacement longitudinally of the stem whereby the slips may be moved radially by moving the stem longitudinally in respect to the body structure, a flange depending from the lower part of the body structure forming an enlarged recess, a hub having an upwardly extending annular wall with a collar thereon, antifriction bearings secured in the said recess and engaging the said collar, a pinion on the stem, an internal gear on the wall of the hub, and a series of gears mounted on shafts secured in the body structure, said latter gears meshing with the pinion and the internal gear, whereby rotation of the stem in one direction causes a reverse rotation of the hub.

4. A fishing tool attachment comprising in combination a body structure having radial slideways, a stem slidably and rotatably mounted in said structure, a hub rotatably mounted on the lower end of the structure, a wedge block rotatably secured to the stem, means holding said wedge block against longitudinal displacement in respect to the stem, slips in the slideways, interengaging means between the wedge block and slips to force said slips into engagement with a well casing on downward movement of the stem to hold the body structure stationary, and a system of gears between the stem and the hub to rotate the hub in an opposite direction to that of the stem, the wedge block having a dovetailed connection with the slips to allow forcing out and drawing in of said slips, and the wedge block being connected to the stem by antifriction bearings to allow free relative rotation.

5. A fishing tool attachment comprising in combination a body structure having radially acting slips mounted therein, a stem slidable and rotatably mounted in said body, a wedge block engaging the slips, said wedge block being mounted on antifriction bearings supported on upper and lower collars on the stem, said wedge block and slips having a dovetail and groove connection, a flange depending from the lower part of the body structure forming an enlarged recess, a hub having an upwardly extending annular wall with a collar thereon, antifriction bearings secured in the recess and engaging the said collar, a pinion on the stem, an internal gear on the wall of the hub, and a series of gears mounted on shafts secured in the body structure, said latter gears meshing with the pinion and the internal gear, whereby rotation of the stem in one direction causes a reverse rotation of the hub.

In testimony whereof I have signed my name to this specification.

CHAS. T. FLEMING.